(12) United States Patent
Chen

(10) Patent No.: US 11,527,903 B2
(45) Date of Patent: Dec. 13, 2022

(54) CHARGING CONTROL METHOD USED FOR DEVICE TO-BE-CHARGED THAT INVOLVES CONTROLLING CHARGED DEVICE TO NEXT CONSTANT-CURRENT CHARGING PHASE

(71) Applicant: GUANGDONG OPPO MOBILE TELECOMMUNICATIONS CORP., LTD., Guangdong (CN)

(72) Inventor: Wei Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 16 days.

(21) Appl. No.: 16/842,142

(22) Filed: Apr. 7, 2020

(65) Prior Publication Data
US 2020/0235601 A1 Jul. 23, 2020

Related U.S. Application Data

(63) Continuation of application No. PCT/CN2018/122747, filed on Dec. 21, 2018.

(51) Int. Cl.
*H02J 7/00* (2006.01)
(52) U.S. Cl.
CPC ...... *H02J 7/0071* (2020.01); *H02J 7/007184* (2020.01)
(58) Field of Classification Search
CPC .................................................... H02J 7/0071
(Continued)

(56) References Cited

U.S. PATENT DOCUMENTS

2005/0134221 A1* 6/2005 Wanibuchi ............ H02J 7/0071
 320/128
2008/0309293 A1 12/2008 Kung et al.
(Continued)

FOREIGN PATENT DOCUMENTS

CN 101800344 A 8/2010
CN 101820085 A 9/2010
(Continued)

OTHER PUBLICATIONS

Australian Second Examination Report for AU Application 2018437254 dated Jun. 1, 2021. (6 pages).
(Continued)

*Primary Examiner* — Yalkew Fantu
(74) *Attorney, Agent, or Firm* — Young Basile Hanlon & MacFarlane, P.C.

(57) ABSTRACT

A charging control method and apparatus, and a device to-be-charged are provided. The method is applicable to the device to-be-charged. The device to-be-charged includes a battery which includes multiple cells. In charging of the device to-be-charged, K stages of constant-current charging is applied to the battery, where K is a positive integer greater than or equal to one. In each of the K stages, a preset current corresponding to the stage is applied to the battery for constant-current charging until a voltage of the battery reaches a preset voltage corresponding to the stage. In each of the K stages, a charging voltage applied to the battery and a voltage across each of the multiple cells are detected. When the charging voltage and/or a voltage across any of the multiple cells is higher than the preset voltage corresponding to the stage, proceed to a next constant-current charging stage.

17 Claims, 4 Drawing Sheets

(58) Field of Classification Search
USPC .......................................................... 320/125
See application file for complete search history.

(56) References Cited

U.S. PATENT DOCUMENTS

| | | | | |
|---|---|---|---|---|
| 2010/0327810 | A1* | 12/2010 | Jimbo | ............... H02J 7/007182 |
| | | | | 320/126 |
| 2012/0086406 | A1 | 4/2012 | Maeagawa | |
| 2012/0126750 | A1 | 5/2012 | Morina et al. | |
| 2014/0159644 | A1* | 6/2014 | Kung | ................. H02J 7/00718 |
| | | | | 320/107 |
| 2015/0214756 | A1* | 7/2015 | Shih | ........................ H02J 7/007 |
| | | | | 320/112 |
| 2015/0340885 | A1 | 11/2015 | Baek et al. | |
| 2016/0181832 | A1 | 6/2016 | Hatano et al. | |
| 2017/0104359 | A1 | 4/2017 | Jung et al. | |
| 2018/0205234 | A1* | 7/2018 | Zhang | ................ H02J 7/00718 |

FOREIGN PATENT DOCUMENTS

| | | |
|---|---|---|
| CN | 101953015 A | 1/2011 |
| CN | 102474124 A | 5/2012 |
| CN | 102769156 A | 11/2012 |
| CN | 103107378 A | 5/2013 |
| CN | 106887884 A | 6/2017 |
| CN | 107808987 A | 3/2018 |
| CN | 108539804 A | 9/2018 |
| JP | 11097074 A | 4/1999 |
| JP | 2005151683 A | 6/2005 |
| WO | 2006021842 A1 | 3/2006 |
| WO | 2010079563 A1 | 7/2010 |
| WO | 2018028563 A1 | 2/2018 |
| WO | 2019227419 A1 | 12/2019 |

OTHER PUBLICATIONS

Chinese Second Office Action with English Translation for CN Application 201880041125.5 dated Apr. 6, 2021. (18 pages).
Chinese Third Office Action with English Translation for CN Application 201880041125.5 dated Jun. 9, 2021. (15 pages).
Examination Report No. 1 issued for Australian Application No. 2018437254 dated Dec. 23, 2020.
Office Action and Translation issued for Chinese Application No. 201880041125.5 dated Jan. 20, 2021.
International Search Report and Translation issued for International Application No. PCT/CN2018/122747 dated Sep. 19, 2019.
Communication pursuant to Article 94(3) EPC for EP Application 18939126.1 dated Mar. 25, 2022. (7 pages).
Chinese Office Action with English Translation for CN Application 201880041125.5 dated Mar. 30, 2022. (48 pages).
Chinese Notification of reexamination with English Translation for CN Application 201880041125.5 dated Feb. 7, 2022 (17 pages).
Extended European Search Report for EP Application 18939126.1 dated Aug. 13, 2021. (9 pages).
Indian Examination Report for IN Application 202017014545 dated Sep. 10, 2021. (6 pages).
Japanese Notice of Reasons for Refusal with English Translation for JP Application 2021514972 dated May 6, 2022. (9 pages).

* cited by examiner

CHARGING CONTROL METHOD USED FOR DEVICE TO-BE-CHARGED THAT INVOLVES CONTROLLING CHARGED DEVICE TO NEXT CONSTANT-CURRENT CHARGING PHASE

CROSS-REFERENCE TO RELATED APPLICATION(S)

This application is a continuation of International Application No. PCT/CN2018/122747, filed on Dec. 21, 2018, the disclosure of which is hereby incorporated by reference in its entirety.

TECHNICAL FIELD

This disclosure relates to the field of charging technology, and more particularly to a charging control method and apparatus, and a computer storage medium.

BACKGROUND

Currently, a charging procedure of an electronic device can include a trickle charging stage, a constant-current charging stage, and a constant-voltage charging stage. According to an existing charging procedure, after detecting (such as by a system) that a voltage of a battery has reached a threshold voltage corresponding to constant-current charging, the charging procedure will proceed to constant-voltage charging and remain in the constant-voltage charging stage until charging is ended when a charging cut-off condition is satisfied. In addition, a charging voltage applied to the electronic device in the whole constant-voltage charging does not exceed a rated voltage of the battery. As such, since constant-current charging lasts only for a short time, constant-voltage charging lasts for a long time, which causes the whole charging process to be too long and therefore wastes time and meanwhile decreases charging speed.

SUMMARY

In a first aspect, a charging control method is provided. The method is applicable to a device to-be-charged. The device to-be-charged includes a battery which includes multiple cells. The method includes the following. In charging of the device to-be-charged, K stages of constant-current charging is applied to the battery, where K is a positive integer greater than or equal to one. In each of the K stages, a preset current corresponding to the stage is applied to the battery for constant-current charging until a voltage of the battery reaches a preset voltage corresponding to the stage, where a preset voltage corresponding to a $K^{th}$ stage is a charging cut-off voltage, and the charging cut-off voltage is higher than a rated voltage of the battery. In each of the K stages, a charging voltage applied to the battery and a voltage across each of the multiple cells are detected. When the charging voltage and/or a voltage across any of the multiple cells is higher than the preset voltage corresponding to the stage, the charging is controlled to proceed to a next constant-current charging stage.

In a second aspect, a charging control apparatus is provided. The apparatus is applicable to a device to-be-charged. The device to-be-charged includes a battery which includes multiple cells. The charging control apparatus includes a charging unit, a detecting unit, and a control unit. The charging unit is configured to apply K stages of constant-current charging to the battery in charging of the device to-be-charged, where K is a positive integer greater than or equal to one. The charging unit is further configured to, in each of the K stages, apply a preset current corresponding to the stage to the battery for constant-current charging until a voltage of the battery reaches a preset voltage corresponding to the stage, where a preset voltage corresponding to a $K^{th}$ stage is a charging cut-off voltage, and the charging cut-off voltage is higher than a rated voltage of the battery. The detecting unit is configured to, in each of the K stages, detect a charging voltage applied to the battery and a voltage across each of the multiple cells. The control unit is configured to control the charging to proceed to a next constant-current charging stage when the charging voltage and/or a voltage across any of the multiple cells is higher than the preset voltage corresponding to the stage.

In a third aspect, a device to-be-charged is provided. The device to-be-charged includes a battery, a memory, and a processor. The battery includes a plurality of cells. The memory is configured to store computer programs operable with the processor. The processor is configured to perform the method described in the first aspect when executing the computer programs.

DETAILED DESCRIPTION

Figure 1:
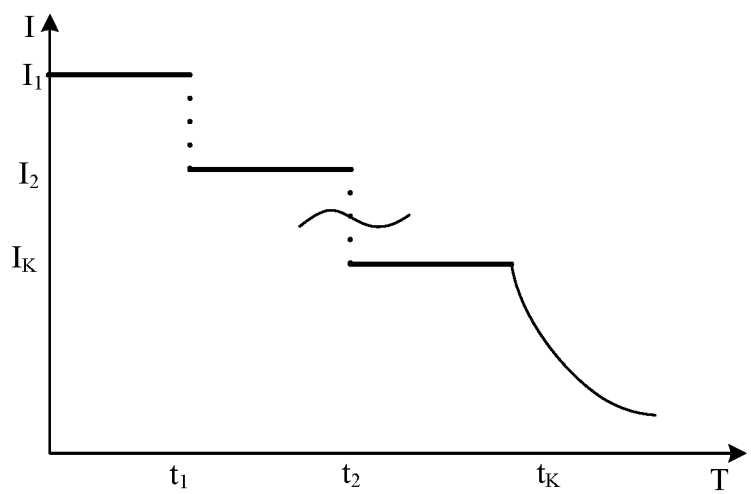
FIG. 1 is a schematic diagram of a step-like charging technology in the related art.

In order to better understand features and technical contents of implementations, in the following, implementations will be described in detail with reference to the accompanying drawings. The accompanying drawings are for illustrative purpose only and are however not intended for limiting implementations.

With rapid development of charging technology, the charging technology mainly includes wired charging technology and wireless charging technology at present. When a device to-be-charged is charged by a user, the device to-be-charged is coupled with a charging apparatus (such as different types of adapters) via a charging cable for charging, which is referred to as the wired charging technology. However, when no charging cable is available or a certain distance between the device to-be-charged and the charging apparatus is desired, the device to-be-charged can be charged through the wireless charging technology. The wireless charging technology originates from wireless power transmission technology. In terms of different wireless charging principles, a wireless charging mode mainly includes an electromagnetic induction (or magnetic coupling) mode, a radio wave mode, and an electromagnetic resonance mode. Take the electromagnetic induction mode as an example. In the electromagnetic induction mode, energy is transferred between the device to-be-charged and the charging apparatus (such as a wireless charging base) in the form of magnetic field, and charging can be achieved without the charging cable.

It can be understood that, no matter whether the wired charging technology or the wireless charging technology is adopted, currently, a charging procedure generally includes a constant-current (CC) charging stage and a constant-voltage (CV) charging stage. However, the constant-voltage charging stage lasts for a long time. If time required for constant-voltage charging can be shortened during charging, a charging speed of a battery of the device to-be-charged will be greatly increased.

In the related art, according to a traditional charging process, a constant charging current is first applied to a battery for charging until a voltage across the battery of the device to-be-charged reaches a threshold voltage, where the threshold voltage does not exceed a rated voltage of the battery. Then the threshold voltage is applied for constant-voltage charging, and a charging voltage will not exceed the rated voltage of the battery during the whole charging process. In the traditional charging process, constant-current charging lasts for a short time and accordingly, constant-voltage charging will last for a long time, which prolongs the whole charging process.

To shorten the charging process, a step-like charging technology, as a quick charging scheme, is enjoying increasing popularity. An existing step-like charging technology is only applicable to a battery with a single cell, and the constant-voltage charging stage is still retained. According to principles of step-like charging, in charging of the device to-be-charged, a first charging current is first applied for constant-current charging until the voltage across the battery reaches a first threshold voltage. Then the first charging current is decreased to a second charging current, and the second charging current is applied for constant-current charging until the voltage across the battery reaches a second threshold voltage. A charging current is decreased gradually and the above steps are repeated. When an $n^{th}$ charging current is applied for constant-current charging until the voltage across the battery reaches an $n^{th}$ threshold voltage (where the $n^{th}$ threshold voltage does not exceed the rated voltage of the battery), the $n^{th}$ threshold voltage is applied for constant-voltage charging until the charging current decreases to a cut-off current of the battery, where n is a positive integer greater than or equal to one.

FIG. 1 is a schematic diagram of a step-like charging technology in the related art. As illustrated in FIG. 1, horizontal axis represents time (T) and vertical axis represents charging current (I). At first, a first charging current $I_1$ is applied for constant-current charging until the voltage across the battery reaches a first threshold voltage $V_1$ at first charging time $t_1$. Then the first charging current $I_1$ is decreased to a second charging current $I_2$, and the second charging current $I_2$ is applied for constant-current charging, until the voltage across the battery reaches a second threshold voltage $V_2$ at second charging time $t_2$. The charging current is decreased gradually and the above steps are repeated. When an $n^{th}$ charging current $I_n$ is applied for constant-current charging until the voltage across the battery reaches an $n^{th}$ threshold voltage $V_n$ (that is, a charging cut off voltage $V_{end}$), the $n^{th}$ threshold voltage $V_n$ is applied for constant-voltage charging until the charging current decreases to a charging cut-off current $I_{end}$, where $V_1$, $V_2$, ..., and $V_n$ each do not exceed the rated voltage of the battery.

In the related art, although the step-like charging technology has been proposed, the step-like charging technology is not applicable to a battery with multiple cells. In addition, constant-current charging and constant-voltage charging are performed on the battery during charging, and the charging voltage during the whole constant-voltage charging stage does not exceed the rated voltage of the battery, and therefore it is desirable to further shorten a charging duration of the device to-be-charged.

Based on the above, implementations provide a charging control method. The method is applicable to a device to-be-charged. The device to-be-charged includes a battery which includes multiple cells. In the method, in charging of the device to-be-charged, K stages ($1^{st}$ state, $2^{nd}$ stage, $(K-1)^{th}$ stage, $K^{th}$ stage) of constant-current charging is applied to the battery, where K is a positive integer greater than or equal to one. In each of the K stages, a preset current corresponding to the stage is applied to the battery for constant-current charging until a voltage of the battery reaches a preset voltage corresponding to the stage. In each of the K stages, a charging voltage applied to the battery and a voltage across each of the multiple cells are detected. When the charging voltage and/or a voltage across any of the multiple cells is higher than the preset voltage corresponding to the stage, the charging procedure is controlled to proceed to a next constant-current charging stage. The above charging process is applicable to a battery including multiple cells. In addition, multi-stage constant-current charging is applied, which is possible to fully prolong the duration of constant-current charging, thereby shortening the duration of the whole charging process and therefore increasing charging speed.

It should be noted that, the "device to-be-charged" can be a terminal. The terminal can include but is not limited to a device configured to receive/transmit communication signals via a wired line and/or a wireless interface. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with another communication terminal. A communication terminal configured to communicate via a wireless interface may be called a "wireless communication terminal", a "wireless terminal", and/or a "mobile terminal". Examples of the mobile terminal may include, but are not limited to, mobile terminal devices such as a mobile phone, a tablet computer, a notebook computer, a handheld computer, a personal digital assistant (PDA), a portable media player (PMP), a navigation device, etc., or fixed terminal devices such as a digital TV, a desktop computer, etc. In addition, the device to-be-charged herein may also include a power bank which can store received charging energy to be provided to other electronic devices. There is no particular restriction on the type of the device to-be-charged in implementations.

Figure 2:
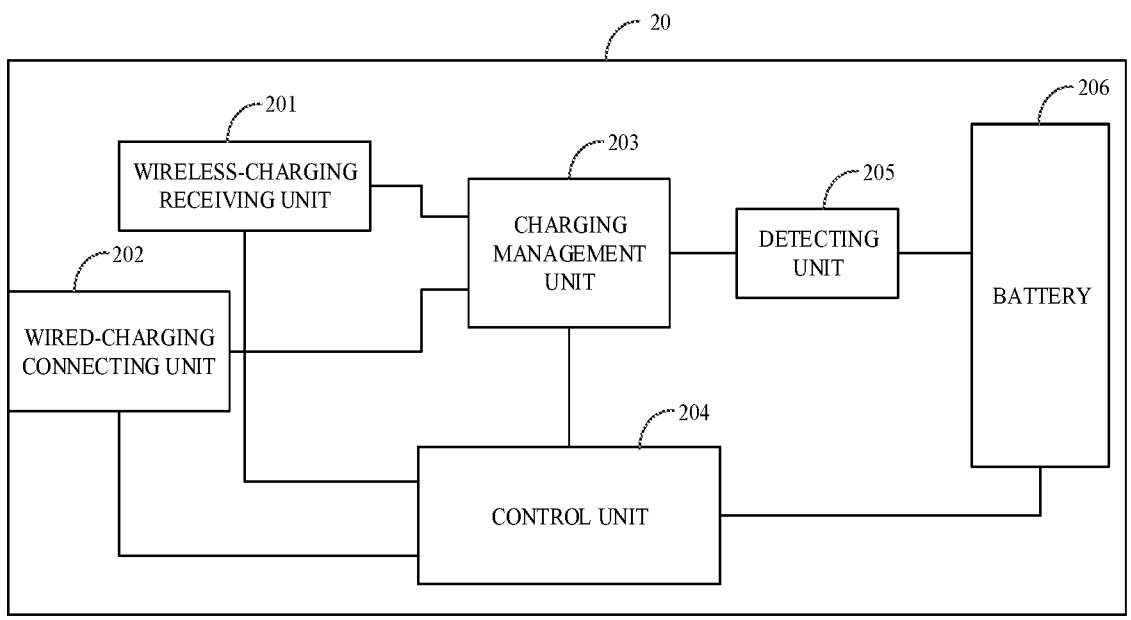
FIG. 2 is a schematic structural diagram illustrating a device to-be-charged according to implementations.

FIG. 2 is a schematic structural diagram illustrating a device to-be-charged according to implementations. As illustrated in FIG. 2, the device to-be-charged 20 includes a wireless-charging receiving unit 201, a wired-charging connecting unit 202, a charging management unit 203, a control unit 204, a detecting unit 205, and a battery 206. Those skilled in the art can understand that the structure of the device to-be-charged 20 illustrated in FIG. 2 does not constitute any limitation on the structure of a device to-be-charged. The device to-be-charged may include more or fewer components than illustrated or may combine certain components or have different configurations or arrangements of components.

It is to be noted that, in some examples, the wireless-charging receiving unit 201 or the wired-charging connecting unit 202 may not be included in the device to-be-charged 20. When the device to-be-charged 20 is operable only in a wireless charging mode, the device to-be-charged 20 can include only the wireless-charging receiving unit 201. When the device to-be-charged 20 is operable only in a wired charging mode, the device to-be-charged 20 can include only the wired-charging connecting unit 202. When the device to-be-charged 20 is operable both in the wireless charging mode and in the wired charging mode, the device to-be-charged 20 can include both the wireless-charging receiving unit 201 and the wired-charging connecting unit 202, which is not limited herein.

In addition, an external wired charging apparatus (such as an adaptor) can be coupled with the device to-be-charged 20 in a wired manner via a charging cable. Specifically, the external wired charging apparatus is coupled with the wired-charging connecting unit 202 via the charging cable. The external wired charging apparatus and the wired-charging connecting unit 202 can communicate with each other for charging negotiation based on handshake communication protocol. An external wireless charging apparatus (such as a wireless charging base) can be wirelessly coupled with the device to-be-charged 20 through electromagnetic induction. Specifically, the external wireless charging apparatus is wirelessly coupled, via an internal wireless-charging transmitting unit thereof, with the wireless-charging receiving unit 201 through electromagnetic induction for wireless communication.

In some examples, a wireless communication manner includes but is not limited to Bluetooth, wireless fidelity (WiFi), near field communication (NFC) based on high carrier frequency, optical communication, ultra-sonic wave communication, ultra-wideband communication, mobile communication, etc., which is not limited herein.

In some examples, the wireless-charging receiving unit 201 includes a receiving coil and an AC/DC converting unit. The wireless-charging receiving unit 201 is configured to convert, through the receiving coil, a wireless charging signal transmitted by a wireless charging apparatus into an alternating current (AC) and then rectify and/or filter the AC with the AC/DC converting unit to convert the AC into a steady direct current (DC) to be applied to the battery 206 for charging.

In some examples, the wired-charging connecting unit 202 includes a universal serial bus (USB) interface. The wired-charging connecting unit 202 is configured to be coupled with a wired charging apparatus and receive a DC voltage and a DC current from the wired charging apparatus to be applied to the battery 206 for charging.

In some examples, the charging management unit 203 is configured to increase or decrease a DC voltage outputted from the wireless-charging receiving unit 201 to obtain a first output voltage and a first output current. The first output voltage and the first output current meet requirements on charging of the battery 206 and can be directly applied to the battery 206 for charging.

In some examples, the charging management unit 203 is further configured to increase voltage or decrease voltage of a DC outputted by the wired-charging connecting unit 202 to obtain a second output voltage and a second output current. The second output voltage and the second output current meet requirements on charging of the battery 206 and can be directly applied to the battery 206 for charging.

In some examples, the charging management unit 203 includes a voltage converting unit. The voltage converting unit may be a boost circuit, a buck circuit, a buck-boost circuit, or a low-dropout (LDO) regulator. The voltage converting unit may also be a charge pump or even a direct charging circuit, which is not limited herein.

In some examples, the control unit 204 is configured to switch on (that is, enable) a path between the charging management unit 203 and the wireless-charging receiving unit 201 upon determining that the device to-be-charged 20 is in the wireless charging mode. The control unit 204 is further configured to switch on a path between the charging management unit 203 and the wired-charging connecting unit 202 upon determining that the device to-be-charged 20 is in the wired charging mode.

In some examples, the control unit 204 may be an independent microcontroller unit (MCU) in the device to-be-charged 20, which can improve control reliability. In other examples, the control unit 204 may also be an application processor (AP) in the device to-be-charged 20, which is possible to save hardware costs. There is no specific restriction on the type of the control unit 204 in implementations.

The detecting unit 205 is configured to detect a battery voltage and/or a battery current of the battery 206. The battery voltage and the battery current may be a voltage and/or a current between the charging management unit 203 and the battery 206, that is, an output voltage and/or an output current of the charging management unit 203.

In some examples, the detecting unit 205 can include a voltage detecting unit and a current detecting unit. The voltage detecting unit is configured to sample a battery voltage and send a sampled battery voltage value to the control unit 204. The voltage detecting unit can sample the battery voltage for example, with aid of at least one resistor coupled in series for voltage division ("voltage-dividing resistor" or "voltage divider"). The current detecting unit is configured to sample a battery current and send a sampled battery current value to the control unit 204. As an example, the current detecting unit can sample and detect the battery current via a current sensing resistor and a current detector.

The control unit 204 is further configured to communicate with the wireless charging apparatus to feed back the voltage value and/or the current value detected by the detecting unit 205 to the wireless charging apparatus. As such, the wireless charging apparatus can adjust a transmission power thereof according to the voltage value and/or the current value fed back, until the battery voltage value and/or the battery current value matches a charging voltage value and/or a charging current value required by the battery 206.

Based on the device to-be-charged illustrated in FIG. 2, the following will describe implementations in detail with reference to the accompanying drawings.

Figure 3:
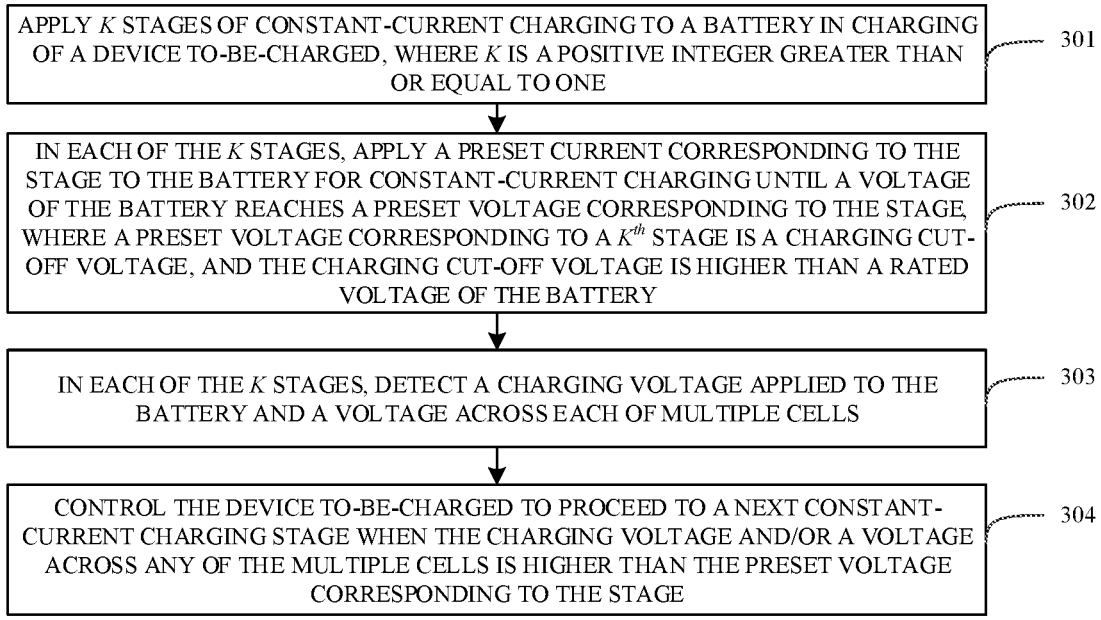
FIG. 3 is a schematic flowchart of a charging control method according to implementations.

FIG. 3 is a schematic flowchart of a charging control method according to implementations. The method is applicable to a device to-be-charged. The device to-be-charged includes a battery which includes multiple cells. The method begins at block 301.

At block 301, in charging of the device to-be-charged, K stages ($1^{st}$ state, $2^{nd}$ stage, $(K-1)^{th}$ stage, $K^{th}$ stage) of constant-current charging is applied to the battery, where K is a positive integer greater than or equal to one.

At block 302, in each of the K stages, a preset current corresponding to the stage is applied to the battery for constant-current charging until a voltage of the battery reaches a preset voltage corresponding to the stage, where a preset voltage corresponding to a $K^{th}$ stage is a charging cut-off voltage, and the charging cut-off voltage is higher than a rated voltage of the battery.

Voltages and currents used herein are listed below.

$i^{th}$ preset current: a preset current corresponding to the $i^{th}$ stage, that is, a charging current applied to the battery for charging in the $i^{th}$ stage, $1 \leq i \leq K-1$.

$i^{th}$ preset voltage: a preset voltage corresponding to the $i^{th}$ stage, that is, a threshold voltage of the $i^{th}$ stage, once the voltage of the battery reaches the $i^{th}$ preset voltage, the charging process will proceed to the $(i+1)^{th}$ stage from the $i^{th}$ stage, $1 \leq i \leq K-1$.

$K^{th}$ preset current: a preset current corresponding to the $K^{th}$ stage, that is, a charging current applied to the battery for charging in the $K^{th}$ stage.

$K^{th}$ preset voltage: a preset voltage corresponding to the $K^{th}$ stage, which is a charging cut-off voltage of the battery.

$i^{th}$ preset cell voltage: the preset threshold voltage of a single cell in the $i^{th}$ stage, once the voltage of any cell is higher than the $i^{th}$ preset cell voltage, the charging process will proceed to the $(i+1)^{th}$ stage from the $i^{th}$ stage.

$K^{th}$ preset cell voltage: the preset threshold voltage of a single cell in the $K^{th}$ stage, once the voltage of any cell is higher than the $K^{th}$ preset cell voltage, the charging of the battery will be ended.

When the multiple cells are coupled in parallel, the charging cut-off voltage (that is, $K^{th}$ preset voltage) is equal to the $K^{th}$ preset cell voltage. When the multiple cells are coupled in series, the charging cut-off voltage (that is, $K^{th}$ preset voltage) is equal to N*the $K^{th}$ preset cell voltage, N is the number of cells.

At block 303, in each of the K stages, a charging voltage applied to the battery and a voltage across each of the multiple cells are detected.

At block 304, when the charging voltage and/or a voltage across any of the multiple cells is higher than the preset voltage corresponding to the stage, the charging procedure is controlled to proceed to a next constant-current charging stage.

It is to be noted that, a charging process of the device to-be-charged can include multiple constant-current charging stages. The number of constant-current charging stages can be represented by K, where K is a positive integer greater than or equal to one, for example, K=5. However, in practice, K can be set according to actual needs (such as the configuration, the arrangement, the material, etc. of the battery), which is not limited herein.

In addition, as mentioned above, a $K^{th}$ preset voltage represents the preset voltage corresponding to the $K^{th}$ stage, that is, the charging cut-off voltage of the battery of the device to-be-charged. In this way, in a final constant-current charging stage, if the voltage of the battery is detected to be equal to the charging cut-off voltage, charging of the battery will be directly ended.

According to implementations, the method is applicable to a device to-be-charged. The device to-be-charged includes a battery which includes multiple cells. In charging of the device to-be-charged, the K stages of constant-current charging is applied to the battery, where K is a positive integer greater than or equal to one. In each of the K stages, the preset current corresponding to the stage is applied to the battery for constant-current charging until the voltage of the battery reaches the preset voltage corresponding to the stage. In each of the K stages, the charging voltage applied to the battery and the voltage across each of the multiple cells are detected. When the charging voltage and/or the voltage across any of the multiple cells is higher than the preset voltage corresponding to the stage, the charging procedure is controlled to proceed to the next constant-current charging stage. The above charging process is applicable to a battery with multiple cells. In addition, multi-stage constant-current charging is applied, and as such, constant-current charging can be prolonged to the fullest, thereby shortening the duration for the whole charging process and increasing charging speed.

In some implementations, in each of the K stages, the preset current corresponding to the stage is applied to the battery for constant-current charging until the voltage of the battery reaches the preset voltage corresponding to the stage as follows. In an $i^{th}$ stage of first K-1 stages, an $i^{th}$ preset current is applied to the battery for constant-current charging until the voltage of the battery reaches an $i^{th}$ preset voltage, where i is a positive integer which is greater than or equal to one and less than or equal to K-1, and an $(i+1)^{th}$ preset current is smaller than the $i^{th}$ preset current. In the $K^{th}$ stage, a $K^{th}$ preset current is applied to the battery for constant-current charging until the voltage of the battery reaches a $K^{th}$ preset voltage, where the $K^{th}$ preset current is smaller than a $(K-1)^{th}$ preset current, and the $K^{th}$ preset voltage is the charging cut-off voltage.

It is to be noted that, for each constant-current charging stage (such as the $i^{th}$ stage), the $i^{th}$ preset current and the $i^{th}$ preset voltage are respectively representative of a current value and a voltage value which have been set in advance for the $i^{th}$ stage for the device to-be-charged. Since when a large current is applied for constant-current charging, the charging voltage drops after charging stops, a charging current decreases as i increases, that is, the $(i+1)^{th}$ preset current is smaller than the $i^{th}$ preset current. For example, assume that K=5, and the multiple cells in the battery of the device to-be-charged are coupled in parallel. For a first constant-current charging stage, a first preset current is X (ampere, A), and a first preset voltage is Y1 (volt, V). For a second constant-current charging stage, a second preset current is X−ΔA1, and a second preset voltage is Y2 (V). For a third constant-current charging stage, a third preset current is X−ΔA1−ΔA2, and a third preset voltage is Y3 (V). For a fourth constant-current charging stage, a fourth preset current is X−ΔA1−ΔA2−ΔA3, and a fourth preset voltage is Y4 (V). For a fifth constant-current charging stage, a fifth preset current is X−ΔA1−ΔA2−ΔA3−ΔA4, and a fifth preset voltage is Y5 (V). However, in practical situations, the $i^{th}$ preset current and the $i^{th}$ preset voltage are set according to actual needs (such as the configuration, the material, etc. of the battery), which is not limited herein.

According to implementations, the first preset current X may be greater than 3 A, for example, 4 A. The second preset current decreases gradually to the fifth preset current, that is, a current in a later stage is smaller than that in a former stage. For example, ΔA1, ΔA2, ΔA3, and ΔA4 may be set to a value between 0.5 and 1. As an example, the first preset voltage Y1, the second preset voltage Y2, the third preset voltage Y3, the fourth preset voltage Y4, and the fifth preset voltage Y5 may be equal to or higher than the rated voltage of the battery. For instance, assume that the rated voltage of the battery is $V_0$, and then Y1, Y2, Y3, Y4, and Y5 can be equal to $V_0+\Delta V$, where $\Delta V$ may be set to a value between 0.05 and 0.5.

According to implementations, for each of the K stages, the preset voltage corresponding to the stage may be the same or different and may be higher than the rated voltage of the battery. For multiple cells, a preset voltage of any of the multiple cells corresponding to each stage may be higher than a rated voltage of a single cell. In this way, each of the multiple cells can be overvoltage charged, thereby shortening a charging duration as much as possible and saving charging time.

In some implementations, in the $i^{th}$ stage, when the charging voltage and/or the voltage across any of the multiple cells is higher than the preset voltage corresponding to the stage, the charging procedure is controlled to proceed to the next constant-current charging stage as follows. Determine, based on the charging voltage detected, whether the charging voltage is higher than the $i^{th}$ preset voltage, where the $i^{th}$ preset voltage represents a preset threshold voltage of the battery in the $i^{th}$ stage. For each of the multiple cells, determine, based on the voltage across the cell detected, whether the voltage across the cell is higher than an $i^{th}$ preset cell voltage (that is, an $i^{th}$ preset voltage of a single cell), where the $i^{th}$ preset cell voltage represents a preset threshold voltage of a single cell in the $i^{th}$ stage. When the charging voltage is higher than the $i^{th}$ preset voltage and/or the voltage across any of the multiple cells is higher than the $i^{th}$ preset cell voltage, the charging procedure is controlled to proceed to an $(i+1)^{th}$ stage in such a manner that the voltage across each of the multiple cells detected in the $i^{th}$ stage is not higher than the $i^{th}$ preset cell voltage.

It is to be noted that, the device to-be-charged includes a detecting unit (such as the detecting unit 205 illustrated in FIG. 2). The detecting unit is generally connected in series in a circuit to-be-detected and is configured to measure current and/or voltage in the circuit to-be-detected. According to implementations, the detecting unit may be resistive (such as a current sensing resistor), or a magnetic device (such as a current transformer, a voltage transformer, a Rogowski coil, or a Hall sensor), or a transistor (such as an RDS (ON), etc.), which is not limited herein.

In this way, in the $i^{th}$ stage, when the charging voltage is detected to be equal to the $i^{th}$ preset voltage and/or the voltage across any of the multiple cells is detected to be higher than the $i^{th}$ preset cell voltage, the device to-be-charged proceeds to the $(i+1)^{th}$ stage from the $i^{th}$ stage, such that the voltage across each of the multiple cells detected in the $i^{th}$ stage is not higher than the $i^{th}$ preset cell voltage.

In some implementations, after controlling the charging procedure to proceed to the next constant-current charging stage, the following can be conducted. In the $K^{th}$ stage, upon detecting that charging voltage is higher than the charging cut-off voltage and/or the voltage across any of the multiple cells is higher than a $K^{th}$ preset cell voltage, charging of the battery is ended or the charging cut-off voltage is applied to the battery for constant-voltage charging.

It is to be noted that, when the multiple cells are coupled in parallel, the charging cut-off voltage is equal to the $K^{th}$ preset cell voltage. When the multiple cells are coupled in series, the charging cut-off voltage is equal to the number of cells in the multiple cells*the $K^{th}$ preset cell voltage. As such, after the $K^{th}$ stage, if the charging voltage is higher than the charging cut-off voltage and/or the voltage across any of the multiple cells is higher than the $K^{th}$ preset cell voltage, charging of the battery can be directly ended or the charging cut-off voltage can be applied to the battery for constant-voltage charging, which is not specifically limited herein.

Figure 4:
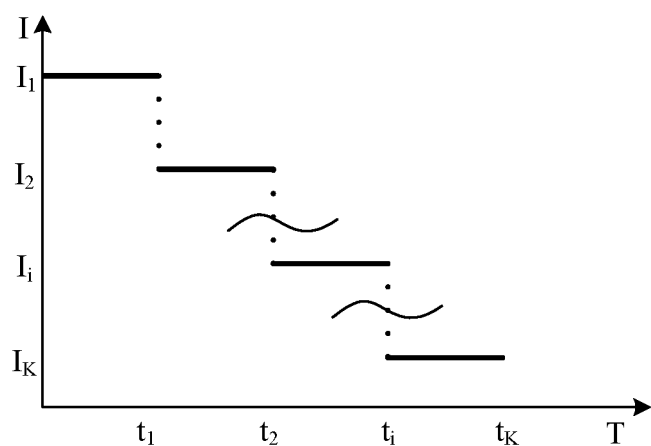
FIG. 4 is a schematic diagram of a charging control technology according to implementations.

FIG. 4 is a schematic diagram of a charging control technology according to implementations. As illustrated in FIG. 4, horizontal coordinates represent time (T) and vertical coordinates represent charging current (I). Assume that the device to-be-charged has K stages of constant-current charging. In a first stage, a first preset current $I_1$ is applied for constant-current charging until the voltage of the battery reaches a first preset voltage $V_1$ at first charging time $t_1$, and the voltage across each of the multiple cells in the first stage does not exceed a first preset cell voltage. Then the charging current is decreased from the first preset current $I_1$ to a second preset current $I_2$, and proceed to a second stage. In the second stage, the second preset current $I_2$ is applied for constant-current charging until the voltage of the battery reaches a second preset voltage $V_2$ at second charging time $t_2$, and the voltage across each of the multiple cells in the second stage does not exceed a second preset cell voltage. The charging current is decreased gradually and the above steps are repeated. When the charging current is decreased to the $i^{th}$ preset current $I_i$, proceed to the $i^{th}$ stage. In the $i^{th}$ stage, the $i^{th}$ preset current i is applied for constant-current charging until the voltage of the battery reaches the $i^{th}$ preset voltage $V_i$ at $i^{th}$ charging time $t_1$, and the voltage across each of the multiple cells in the $i^{th}$ stage does not exceed the $i^{th}$ preset cell voltage. In this way, in a final constant-current charging stage, that is, the $K^{th}$ stage, the $K^{th}$ preset current $I_K$ is applied for constant-current charging until the voltage of the battery reaches the $K^{th}$ preset voltage $V_K$ (that is, the charging cut-off voltage $V_{end}$) at $K^{th}$ charging time $t_K$, and then charging of the battery can be ended. As such, since multi-stage constant-current charging is applied to the above charging process, the constant-current charging process can be prolonged as much as possible. In addition, the constant-voltage charging stage is canceled in the above charging process, thereby further saving charging time of the whole charging process and meanwhile increasing charging speed.

It can be understood that, the $i^{th}$ preset voltage represents the preset threshold voltage of the battery in the $i^{th}$ stage. The $i^{th}$ preset cell voltage represents the preset threshold voltage of a single cell in the $i^{th}$ stage. Assume that the number of cells in the multiple cells is N, where N is a positive integer greater than one. If the multiple cells of the battery are coupled in series, the $i^{th}$ preset voltage is equal to the $i^{th}$ preset cell voltage×N. If the multiple cells of the battery are coupled in parallel, the $i^{th}$ preset voltage is equal to the $i^{th}$ preset cell voltage.

In some implementations, in the $i^{th}$ stage, the $i^{th}$ preset current is applied to the battery for constant-current charging until the voltage of the battery reaches the $i^{th}$ preset voltage as follows. Determine an arrangement of the multiple cells. When the multiple cells are coupled in series, in the $i^{th}$ stage, the $i^{th}$ preset current is applied to the battery for constant-current charging until the voltage of the battery reaches N times the $i^{th}$ preset cell voltage, where N represents the number of cells in the multiple cells, and N is a positive integer greater than one. When the multiple cells are coupled in parallel, in the $i^{th}$ stage, the $i^{th}$ preset current is applied to the battery for constant-current charging until the voltage of the battery reaches the $i^{th}$ preset cell voltage.

It is to be noted that, the multiple cells of the battery can be coupled in series or in parallel, which is not limited herein. When the multiple cells are coupled in series, in the $i^{th}$ stage, the $i^{th}$ preset current is applied to the battery for constant-current charging until the voltage of the battery reaches the N times the $i^{th}$ preset cell voltage (that is, N×the $i^{th}$ preset cell voltage). However, when the multiple cells are coupled in parallel, in the $i^{th}$ stage, the $i^{th}$ preset current is applied to the battery for constant-current charging until the voltage of the battery reaches the $i^{th}$ preset cell voltage.

In some implementations, when the multiple cells are coupled in series, in the $i^{th}$ stage, after the $i^{th}$ preset current is applied to the battery for constant-current charging until the voltage of the battery reaches the N times the $i^{th}$ preset cell voltage, the following can be conducted. The N times the $i^{th}$ preset cell voltage is applied to the battery for constant-voltage charging. Upon detecting that a charging current applied to the battery is equal to the $(i+1)^{th}$ preset current and/or the voltage across any of the multiple cells is higher than the $i^{th}$ preset cell voltage, the charging process is controlled to proceed to an $(i+1)^{th}$ stage, in which the $(i+1)^{th}$ preset current is applied to the battery for constant-current charging.

In some implementations, in the $K^{th}$ stage, the method further includes the following. Upon detecting that the charging voltage is equal to N times a $K^{th}$ preset cell voltage, charging of the battery is ended, where the N times the $K^{th}$ preset cell voltage is the charging cut-off voltage.

In some implementations, in the $K^{th}$ stage, the method further includes the following. Upon detecting that the charging voltage is equal to N times a $K^{th}$ preset cell voltage, the N times the $K^{th}$ preset cell voltage is applied to the battery for constant-voltage charging. Upon detecting that a charging current applied to the battery is smaller than a charging cut-off current, charging of the battery is ended.

In some implementations, when the multiple cells are coupled in parallel, in the $i^{th}$ stage, after the $i^{th}$ preset current is applied to the battery for constant-current charging until the voltage of the battery reaches the $i^{th}$ preset cell voltage, the following can be conducted. The $i^{th}$ preset cell voltage is applied to the battery for constant-voltage charging. Upon detecting that a charging current applied to the battery is equal to the $(i+1)^{th}$ preset current and/or the voltage across any of the multiple cells is higher than the $i^{th}$ preset cell voltage, the charging process is controlled to proceed to an $(i+1)^{th}$ stage, in which the $(i+1)^{th}$ preset current is applied to the battery for constant-current charging.

In some implementations, in the $K^{th}$ stage, the method further includes the following. Upon detecting that the charging voltage is equal to a $K^{th}$ preset cell voltage, charging of the battery is ended, where the $K^{th}$ preset cell voltage is the charging cut-off voltage.

In some implementations, in the $K^{th}$ stage, the method further includes the following. Upon detecting that the charging voltage is equal to a $K^{th}$ preset cell voltage, the $K^{th}$ preset cell voltage is applied to the battery for constant-voltage charging. Upon detecting that a charging current applied to the battery is smaller than a charging cut-off current, charging of the battery is ended.

It is to be noted that, no matter whether the multiple cells are coupled in series or in parallel, in each of multiple constant-current charging stages, constant-voltage charging can be performed as a transition between the present stage and a next stage. In this way, sudden drop in charging current can be avoided. Sudden change in current can have some impact on the material of the battery, which easily results in damage of the battery, reduces durability of the battery, and thus shortens service life of the battery. Therefore, constant-voltage charging can serve as a transition between the $i^{th}$ stage and the $(i+1)^{th}$ stage. As such, in addition to avoiding sudden change in charging current, charging time can be further saved and charging speed can be further increased.

In addition, no matter whether the multiple cells are coupled in series or in parallel, in the $K^{th}$ stage, charging of the battery can be directly ended upon detecting that the voltage of the battery is equal to the $K^{th}$ preset voltage (for example, the $K^{th}$ preset voltage is equal to the N times the $K^{th}$ preset cell voltage when N cells are coupled in series, and the $K^{th}$ preset voltage is equal to the $K^{th}$ preset cell voltage when the N cells are coupled in parallel), and the constant-voltage charging stage is omitted in the above charging process. Alternatively, upon detecting that the voltage of the battery is equal to the $K^{th}$ preset voltage, the $K^{th}$ preset voltage can be applied to the battery for constant-voltage charging. Then, upon detecting that the charging current applied to the battery is smaller than the charging cut-off current, charging of the battery is ended. In the above charging process, although the constant-voltage charging stage is retained, by applying multi-stage constant-current charging, constant-current charging can be prolonged as much as possible, thereby shortening a charging duration for the whole charging process. The above two schemes both can save charging time and increase charging speed, which, in practical situations, are selectively adopted according to actual needs, and there is no particular restriction in implementations.

Figure 5:
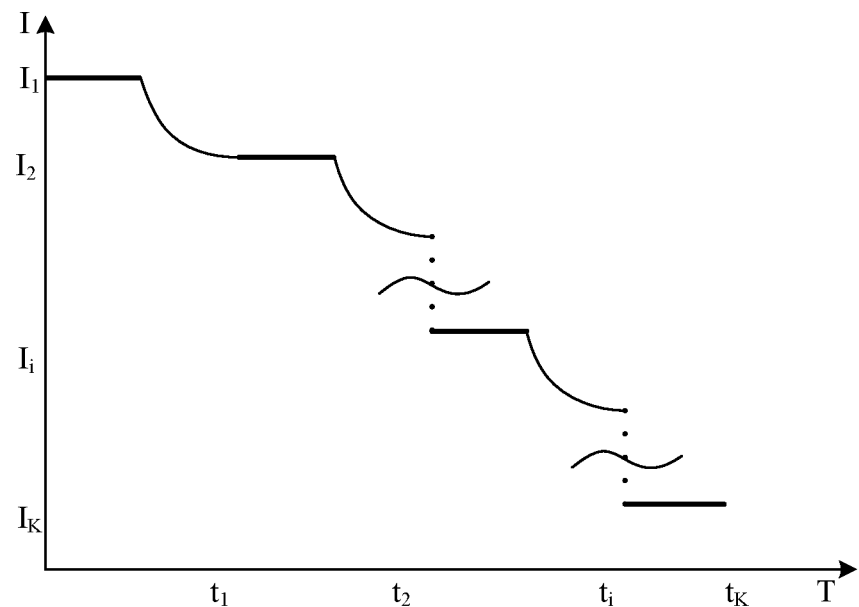
FIG. 5 is a schematic diagram of a charging control technology according to other implementations.

FIG. 5 is a schematic diagram of a charging control technology according to other implementations. As illustrated in FIG. 5, horizontal axis represents time (T) and vertical axis represents charging current (I). Assume K stages of constant-current charging are be performed for charging of the device to-be-charged. In a first stage, a first preset current $I_1$ is applied for constant-current charging until the voltage of the battery reaches a first preset voltage $V_1$, and then the first preset voltage $V_1$ is applied to the battery for constant-voltage charging. At first charging time $t_1$, upon detecting that the charging current applied to the battery is equal to a second preset current $I_2$ and/or the voltage across any of the multiple cells is higher than a first preset cell voltage, the device to-be-charged proceeds to a second stage. In the second stage, the second preset current $I_2$ is applied for constant-current charging until the voltage of the battery reaches a second preset voltage $V_2$, and then the second preset voltage $V_2$ is applied to the battery for constant-voltage charging. At second charging time $t_2$, upon detecting that the charging current applied to the battery is equal to a third preset current $I_3$ and/or the voltage across any of the multiple cells is higher than a second preset cell voltage, the device to-be-charged proceeds to a third stage. The above steps are repeated. In the $i^{th}$ stage, the $i^{th}$ preset current $I_1$ is applied for constant-current charging until the voltage of the battery reaches the $i^{th}$ preset voltage $V_i$, and then the $i^{th}$ preset voltage $V_i$ is applied to the battery for constant-voltage charging. At $i^{th}$ charging time $t_1$, upon detecting that the charging current applied to the battery is equal to an $(i+1)^{th}$ preset current $I_{i+1}$ and/or the voltage across any of the multiple cells is higher than the $i^{th}$ preset cell voltage, the device to-be-charged proceeds to an $(i+1)^{th}$ stage. In this way, in a final constant-current charging stage, that is, the $K^{th}$ stage, the $K^{th}$ preset current $I_K$ is applied for constant-current charging until the voltage of the battery reaches the $K^{th}$ preset voltage $V_K$ (that is, the charging cut-off voltage $V_{end}$). Upon detecting that the charging voltage applied to the battery is equal to $V_k$, charging of the battery is ended.

In some implementations, the $i^{th}$ preset cell voltage is higher than a rated voltage of a single cell.

It is to be noted that, during charging of the device to-be-charged, the $i^{th}$ preset cell voltage represents a preset threshold voltage of a single cell in the $i^{th}$ stage. A preset cell voltage corresponding to each constant-current charging stage may be the same or different, which is not limited herein. According to implementations, the $i^{th}$ preset cell voltage can be higher than the rated voltage of a single cell, such that each of the multiple cells can be overvoltage charged, which is possible to shorten a charging duration as much as possible and save charging time. Therefore, compared with the related art, by adopting the scheme of implementations, charging time can be greatly saved and charging efficiency can be greatly improved.

As an example, the $i^{th}$ preset cell voltage can be set to be equal to the sum of the rated voltage of a single cell and a preset voltage difference, where the preset voltage difference $\Delta V$ may be 0.05V or 0.5V. In general, $\Delta V$ can be a value between 0.05V and 0.5V. In practice, $\Delta V$ is set according to actual needs, which is not limited herein.

In some implementations, a charging mode of the device to-be-charged includes a wireless charging mode and a wired charging mode. The method further includes controlling, by selecting the charging mode, to charge the device to-be-charged so as to charge the battery in the wireless charging mode or in the wired charging mode.

It is to be noted that, the charging control method according to implementations is applicable to both the wireless charging mode of the device to-be-charged and the wired charging mode of the device to-be-charged. By selecting the charging mode, the battery of the device to-be-charged can be charged in the wireless charging mode or in the wired charging mode. In addition, multi-stage constant-current charging is applied to the above charging process, which is possible to prolong constant-current charging to the fullest, thereby shortening a charging duration for the whole charging process and increasing charging speed.

In addition, as an example, when the multiple cells are coupled in parallel, in the $i^{th}$ stage, upon detecting that the voltage across any of the multiple cells is higher than the $i^{th}$ preset cell voltage, a charging path corresponding to the cell of which the voltage has reached the $i^{th}$ preset cell voltage corresponding to the $i^{th}$ stage can be disconnected, and a cell of which the voltage has not reached the $i^{th}$ preset cell voltage continues to be charged. In other words, for multiple cells, charging of each of the multiple cells can be separately controlled according to the charging control method above.

Implementations provide a charging control method. The method is applicable to a device to-be-charged. The device to-be-charged includes a battery which includes multiple cells. In charging of the device to-be-charged, the K stages of constant-current charging is applied to the battery, where K is a positive integer greater than or equal to one. In each of the K stages, the preset current corresponding to the stage is applied to the battery for constant-current charging until the voltage of the battery reaches the preset voltage corresponding to the stage. In each of the K stages, the charging voltage applied to the battery and the voltage across each of the multiple cells are detected. When the charging voltage and/or the voltage across any of the multiple cells is higher than the preset voltage corresponding to the stage, the charging process is controlled to proceed to the next constant-current charging stage. In the above charging process, multi-stage constant-current charging is applied, and as such, constant-current charging can be prolonged to the fullest, thereby shortening the duration for the whole charging process and increasing charging speed.

Figure 6:
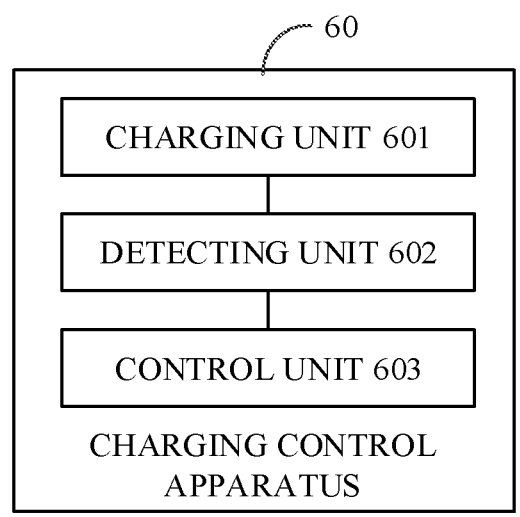
FIG. 6 is a schematic structural diagram illustrating a charging control apparatus according to implementations.

Based on the same conception as that of the technical solution illustrated in FIG. 3, FIG. 6 is a schematic structural diagram illustrating a charging control apparatus 60 according to implementations. The charging control apparatus 60 is applicable to a device to-be-charged. The device to-be-charged includes a battery which includes multiple cells. The charging control apparatus 60 includes a charging unit 601, a detecting unit 602, and a control unit 603. The charging unit 601 is configured to apply K stages of constant-current charging to the battery in charging of the device to-be-charged, where K is a positive integer greater than or equal to one. The charging unit 601 is further configured to, in each of the K stages, apply a preset current corresponding to the stage to the battery for constant-current charging until a voltage of the battery reaches a preset voltage corresponding to the stage, where a preset voltage corresponding to a $K^{th}$ stage is a charging cut-off voltage, and the charging cut-off voltage is higher than a rated voltage of the battery. The detecting unit 602 is configured to, in each of the K stages, detect a charging voltage applied to the battery and a voltage across each of the multiple cells. The control unit 603 is configured to control the charging procedure to proceed to a next constant-current charging stage when the charging voltage and/or a voltage across any of the multiple cells is higher than the preset voltage corresponding to the stage.

In some implementations, the charging unit 601 is configured to operate as follows. The charging unit 601 is configured to, in an $i^{th}$ stage of first K−1 stages, apply an $i^{th}$ preset current to the battery for constant-current charging until the voltage of the battery reaches an $i^{th}$ preset voltage, where i is a positive integer which is greater than or equal to one and less than or equal to K−1, and an $(i+1)^{th}$ preset current is smaller than the $i^{th}$ preset current. The charging unit 601 is configured to, in the $K^{th}$ stage, apply a $K^{th}$ preset current to the battery for constant-current charging until the voltage of the battery reaches a $K^{th}$ preset voltage, where the $K^{th}$ preset current is smaller than a $(K-1)^{th}$ preset current, and the $K^{th}$ preset voltage is the charging cut-off voltage.

In some implementations, the control unit 603 is configured to, in the $i^{th}$ stage, determine, based on the charging voltage detected, whether the charging voltage is higher than the $i^{th}$ preset voltage, where the $i^{th}$ preset voltage represents a preset threshold voltage of the battery in the $i^{th}$ stage; for each of the multiple cells, determine, based on the voltage across the cell detected, whether the voltage across the cell is higher than an $i^{th}$ preset cell voltage, where the $i^{th}$ preset cell voltage represents a preset threshold voltage of a single cell in the $i^{th}$ stage; control the charging to proceed to an $(i+1)^{th}$ stage in such a manner that the voltage across each of the multiple cells detected in the $i^{th}$ stage is not higher than the $i^{th}$ preset cell voltage when the charging voltage is higher than the $i^{th}$ preset voltage and/or the voltage across any of the multiple cells is higher than the $i^{th}$ preset cell voltage.

In some implementations, the control unit 603 is further configured to, in the $K^{th}$ stage, end charging of the battery or apply the charging cut-off voltage to the battery for constant-voltage charging when the detecting unit 602 detects that the charging voltage is higher than the charging cut-off voltage and/or the voltage across any of the multiple cells is higher than a $K^{th}$ preset cell voltage.

In some implementations, the control unit 603 is further configured to determine an arrangement of the multiple cells. When the control unit determines that the multiple cells are coupled in series, the charging unit is configured to operate as follows. The charging unit is configured to, in the $i^{th}$ stage, apply the $i^{th}$ preset current to the battery for constant-current charging until the voltage of the battery reaches N times an $i^{th}$ preset cell voltage, where N represents the number of cells in the multiple cells, and N is a positive integer greater than one. The charging unit is configured to, in the $i^{th}$ stage, apply the $i^{th}$ preset current to the battery for constant-current charging until the voltage of the battery reaches the $i^{th}$ preset cell voltage when the control unit determines that the multiple cells are coupled in parallel.

In some implementations, when the multiple cells are coupled in series, the charging unit 601 is further configured to apply the N times the $i^{th}$ preset cell voltage to the battery for constant-voltage charging; the control unit 603 is further configured to control the charging to proceed to an $(i+1)^{th}$ stage in which the charging unit applies the $(i+1)^{th}$ preset current to the battery for constant-current charging when the detecting unit detects that a charging current applied to the battery is equal to the $(i+1)^{th}$ preset current and/or the voltage across any of the multiple cells is higher than the $i^{th}$ preset cell voltage.

In some implementations, when the multiple cells are coupled in parallel, the charging unit 601 is further configured to apply the $i^{th}$ preset cell voltage to the battery for constant-voltage charging; the control unit 603 is further configured to control the charging to proceed to an $(i+1)^{th}$ stage in which the charging unit applies the $(i+1)^{th}$ preset current to the battery for constant-current charging when the detecting unit detects that a charging current applied to the battery is equal to the $(i+1)^{th}$ preset current and/or the voltage across any of the multiple cells is higher than the $i^{th}$ preset cell voltage.

In some implementations, when the multiple cells are coupled in series, the control unit 603 is further configured to end charging of the battery when the detecting unit detects that the charging voltage is equal to N times a $K^{th}$ preset cell voltage, where the N times the $K^{th}$ preset cell voltage is the charging cut-off voltage.

In some implementations, when the multiple cells are coupled in series, the charging unit 601 is further configured to apply N times a $K^{th}$ preset cell voltage to the battery for constant-voltage charging when the detecting unit detects that the charging voltage is equal to the N times the $K^{th}$ preset cell voltage; the control unit 603 is further configured to end charging of the battery when the detecting unit detects that a charging current applied to the battery is smaller than a charging cut-off current.

In some implementations, when the multiple cells are coupled in parallel, the control unit 603 is further configured to end charging of the battery when the detecting unit detects that the charging voltage is equal to a $K^{th}$ preset cell voltage, where the $K^{th}$ preset cell voltage is the charging cut-off voltage.

In some implementations, when the multiple cells are coupled in parallel, the charging unit 601 is further configured to apply a $K^{th}$ preset cell voltage to the battery for constant-voltage charging when the detecting unit detects that the charging voltage is equal to the $K^{th}$ preset cell voltage; the control unit 603 is further configured to end charging of the battery when the detecting unit detects that a charging current applied to the battery is smaller than a charging cut-off current.

In some implementations, the $i^{th}$ preset cell voltage is higher than a rated voltage of a single cell.

In some implementations, a charging mode of the device to-be-charged includes a wireless charging mode and a wired charging mode. The control unit 603 is further configured to control, by selecting the charging mode, to charge the device to-be-charged so as to charge the battery in the wireless charging mode or in the wired charging mode.

It can be understood that, "units" in implementations herein may be part of a circuit, part of a processor, part of a program or software, etc. "Units" may also be a module or non-modular. In addition, various parts described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., or a processor to execute some or all operations of the methods described in various implementations. The above storage medium may include various kinds of media that can store program codes, such as a USB flash disk, a mobile hard drive, a read only memory (ROM), a random access memory (RAM), a magnetic disk, or an optical disk.

Therefore, implementations provide a computer storage medium. The computer storage medium is configured to store charging control programs which, when executed by at least one processor, are operable with the at least one processor to perform the method in the foregoing technical solution illustrated in FIG. 3.

Figure 7:
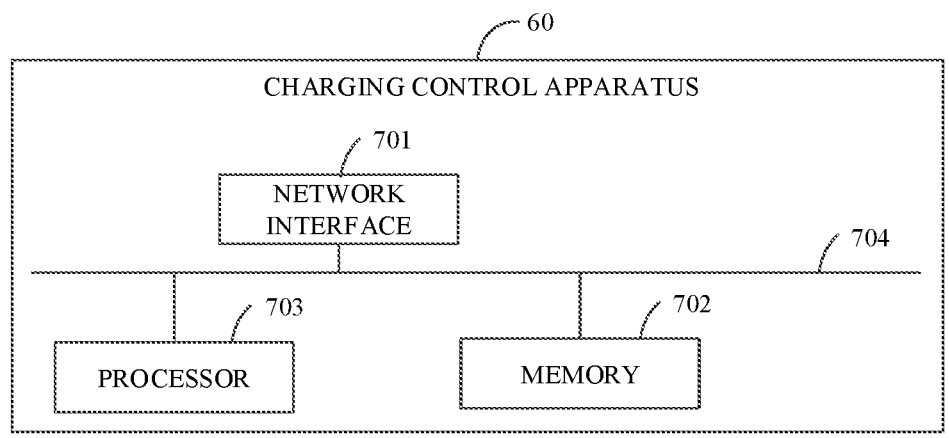
FIG. 7 is a schematic diagram illustrating a hardware structure of a charging control apparatus according to implementations.

Based on the components of the charging control apparatus 60 and the computer storage medium, FIG. 7 is a schematic diagram illustrating a hardware structure of a charging control apparatus 60 according to implementations. The charging control apparatus 60 includes a network interface 701, a memory 702, and a processor 703. The above components are coupled together through a bus system 704. It can be understood that, the bus system 704 is configured for communication between these components. Besides a data bus, the bus system 704 includes a power supply bus, a control bus, and a status signal bus. However, for the sake of simplicity, various types of buses are referred to as the bus system 704 in FIG. 7. The network interface 701 is configured to receive and transmit signals while receiving and sending messages with other external network elements.

The memory 702 is configured to store computer programs operable with the processor 703. The processor 703 is configured to operate as follows when executing the computer programs. The processor 703 is configured to apply K stages of constant-current charging to a battery of a device to-be-charged in charging of the device to-be-charged, where K is a positive integer greater than or equal to one. The processor 703 is configured to, in each of the K stages, apply a preset current corresponding to the stage to the battery for constant-current charging until a voltage of the battery reaches a preset voltage corresponding to the stage, where a preset voltage corresponding to a $K^{th}$ stage is a charging cut-off voltage, and the charging cut-off voltage is higher than a rated voltage of the battery. The processor 703 is configured to, in each of the K stages, detect a charging voltage applied to the battery and a voltage across each of the multiple cells. The processor 703 is configured to control the charging to proceed to a next constant-current charging stage when the charging voltage and/or a voltage across any of the multiple cells is higher than the preset voltage corresponding to the stage.

It can be understood that, the memory 702 according to implementations may be a volatile memory or a non-volatile memory, or may include both the volatile memory and the non-volatile memory. The non-volatile memory may be a ROM, a programmable read only memory (programmable ROM, PROM), an erasable programmable read only memory (erasable PROM, EPROM), an electrically erasable programmable read only memory (electrically EPROM, EEPROM), or a flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDRSDRAM), an enhanced synchronous dynamic random access memory (enhanced SDRAM, ESDRAM), a synchronous link dynamic random access memory (synch-link DRAM, SLDRAM), and a direct rambus random access memory (direct rambus RAM, DRRAM). The memory 702 of the systems and methods described herein is intended to include, but is not limited to, these and any other suitable types of memory.

The processor 703 may be an integrated circuit chip with signal processing capabilities. During implementation, each step of the foregoing method may be completed by an integrated logic circuit of hardware in the processor 703 or an instruction in the form of software. The processor 703 may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a RAM, a flash memory, a ROM, a PROM, or an electrically erasable programmable memory, registers, and the like. The storage medium is located in the memory 702. The processor 703 reads the information in the memory 702, and completes the steps of the method described above with the hardware thereof.

It will be appreciated that implementations described herein can be implemented in one or more of hardware, software, firmware, middleware, and microcode. For hardware implementation, the processing unit can be implemented in one or more ASICs, DSPs, DSP devices (DSPD), programmable logic devices (PLD), FPGAs, general purpose processors, controllers, microcontrollers, microprocessors, other electronic units for performing the functions described herein or a combination thereof.

For a software implementation, the technology described herein can be implemented by modules (e.g., procedures, functions, and so on) for performing the functions described herein. The software code can be stored in the memory and executed by the processor. The memory can be implemented in the processor or external to the processor.

In some implementations, the processor 703 is further configured to, when executing the computer programs, perform the method in the foregoing technical solution illustrated in FIG. 3.

Figure 8:
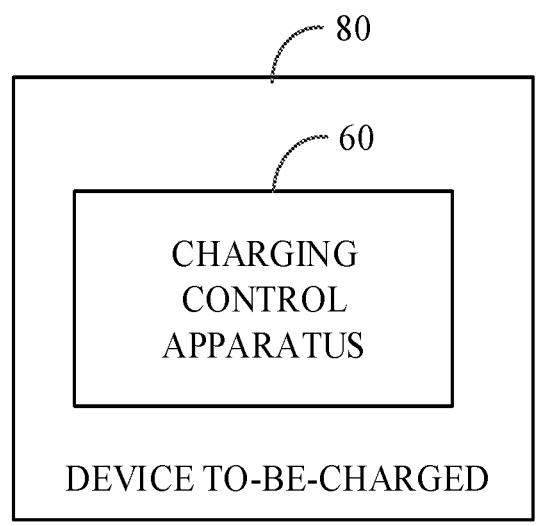
FIG. 8 is a schematic structural diagram illustrating a device to-be-charged according to other implementations.

FIG. 8 is a schematic structural diagram illustrating a device to-be-charged 80 according to other implementations. As illustrated in FIG. 8, the device to-be-charged 80 includes at least the charging control apparatus 60 of any of the foregoing implementations.

It is to be noted that, technical solutions described in various implementations can be combined with each other without conflict.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

INDUSTRIAL APPLICABILITY

According to implementations, the charging control method is applicable to a device to-be-charged. The device to-be-charged includes a battery which includes multiple cells. In charging of the device to-be-charged, the K stages of constant-current charging is applied to the battery, where K is a positive integer greater than or equal to one. In each of the K stages, the preset current corresponding to the stage is applied to the battery for constant-current charging until the voltage of the battery reaches the preset voltage corresponding to the stage. In each of the K stages, the charging voltage applied to the battery and the voltage across each of the multiple cells are detected. When the charging voltage and/or the voltage across any of the multiple cells is higher than the preset voltage corresponding to the stage, the charging procedure is controlled to proceed to the next constant-current charging stage. The above charging process is applicable to a battery with multiple cells. In addition, multi-stage constant-current charging is applied, which is possible to prolong constant-current charging to the fullest, thereby shortening the whole charging process and increasing charging speed.

What is claimed is:

1. A method of charging control for a device to-be-charged, the device to-be-charged comprising a battery which comprises a plurality of cells, and the method comprising:

applying K stages of constant-current charging to the battery in charging of the device to-be-charged, wherein K is a positive integer greater than one;

in each of the K stages, applying a preset current corresponding to the stage to the battery for constant-current charging until a voltage of the battery reaches a preset voltage corresponding to the stage, wherein a preset voltage corresponding to a $K^{th}$ stage is a charging cut-off voltage, and the charging cut-off voltage is higher than a rated voltage of the battery; and in each of the K stages:

detecting a charging voltage applied to the battery and a voltage across each of the plurality of cells; and controlling the charging to proceed to a next constant-current charging stage in response to at least one of the charging voltage and a voltage across any of the plurality of cells being higher than the preset voltage corresponding to the stage;

wherein in each of the K stages, applying the preset current corresponding to the stage to the battery for constant-current charging until the voltage of the battery reaches the preset voltage corresponding to the stage comprises:

in an $i^{th}$ stage of first $K-1$ stages, applying an $i^{th}$ preset current to the battery for constant-current charging until the voltage of the battery reaches an $i^{th}$ preset voltage, wherein i is a positive integer which is greater than or equal to one and less than or equal to $K-1$, and an $(i+1)^{th}$ preset current is smaller than the $i^{th}$ preset current; and in the $K^{th}$ stage, applying a $K^{th}$ preset current to the battery for constant-current charging until the voltage of the battery reaches the charging cut-off voltage, wherein the $K^{th}$ preset current is smaller than a $(K-1)^{th}$ preset current.

2. The method of claim 1, wherein in the $i^{th}$ stage, controlling the device to-be-charged to proceed to the next constant-current charging stage in response to the at least one of the charging voltage and the voltage across any of the plurality of cells being higher than the preset voltage corresponding to the stage comprises:

determining whether the charging voltage is higher than the $i^{th}$ preset voltage, wherein the $i^{th}$ preset voltage represents a preset threshold voltage of the battery in the $i^{th}$ stage;

for each of the plurality of cells, determining whether the voltage across the cell is higher than an $i^{th}$ preset cell voltage, wherein the $i^{th}$ preset cell voltage represents a preset threshold voltage of a single cell in the $i^{th}$ stage; and controlling the charging to proceed to an $(i+1)^{th}$ stage, in response to at least one of the following conditions being satisfied:

the charging voltage is higher than the $i^{th}$ preset voltage; or the voltage across any of the plurality of cells is higher than the $i^{th}$ preset cell voltage.

3. The method of claim 2, wherein the $i^{th}$ preset cell voltage is higher than a rated voltage of the single cell.

4. The method of claim 1, further comprising:

after controlling the charging to proceed to the next constant-current charging stage, in the $K^{th}$ stage, ending charging of the battery or applying the charging cut-off voltage to the battery for constant-voltage charging, upon detecting that at least one of the following conditions is satisfied:

the charging voltage is higher than the charging cut-off voltage; or the voltage across any of the plurality of cells is higher than a $K^{th}$ preset cell voltage.

5. The method of claim 1, wherein in the $i^{th}$ stage, applying the $i^{th}$ preset current to the battery for constant-current charging until the voltage of the battery reaches the $i^{th}$ preset voltage comprises:

determining an arrangement of the plurality of cells;

in response to the plurality of cells being coupled in series, in the $i^{th}$ stage, applying the $i^{th}$ preset current to the battery for constant-current charging until the voltage of the battery reaches N times an $i^{th}$ preset cell voltage, wherein N represents a number of cells in the plurality of cells, and N is a positive integer greater than one, wherein the $i^{th}$ preset cell voltage represents a preset threshold voltage of a single cell in the $i^{th}$ stage; or in response to the plurality of cells being coupled in parallel, in the $i^{th}$ stage, applying the $i^{th}$ preset current to the battery for constant-current charging until the voltage of the battery reaches the $i^{th}$ preset cell voltage.

6. The method of claim 5, in response to the plurality of cells being coupled in series, the method further comprising:

in the $i^{th}$ stage, after applying the $i^{th}$ preset current to the battery for constant-current charging until the voltage of the battery reaches the N times the $i^{th}$ preset cell voltage, applying the N times the $i^{th}$ preset cell voltage to the battery for constant-voltage charging; and controlling the charging to proceed to an $(i+1)^{th}$ stage in which the $(i+1)^{th}$ preset current is applied to the battery for constant-current charging, upon detecting that at least one of the following conditions is satisfied:

a charging current applied to the battery is equal to the $(i+1)^{th}$ preset current; or the voltage across any of the plurality of cells is higher than the $i^{th}$ preset cell voltage.

7. The method of claim 5, in response to the plurality of cells being coupled in parallel, the method further comprising:

in the $i^{th}$ stage, after applying the $i^{th}$ preset current to the battery for constant-current charging until the voltage of the battery reaches the $i^{th}$ preset cell voltage, applying the $i^{th}$ preset cell voltage to the battery for constant-voltage charging; and controlling the charging to proceed to an $(i+1)^{th}$ stage in which the $(i+1)^{th}$ preset current is applied to the battery for constant-current charging, upon detecting that at least one of the following conditions is satisfied:

a charging current applied to the battery is equal to the $(i+1)^{th}$ preset current; or the voltage across any of the plurality of cells is higher than the $i^{th}$ preset cell voltage.

8. The method of claim 5, in response to the plurality of cells being coupled in series, the method further comprising:

in the $K^{th}$ stage, ending charging of the battery upon detecting that the charging voltage is equal to the charging cut-off voltage, wherein the charging cut-off voltage equals to N times a $K^{th}$ preset cell voltage.

9. The method of claim 5, in response to the plurality of cells being coupled in series, the method further comprising:

in the $K^{th}$ stage:

applying the charging cut-off voltage to the battery for constant-voltage charging upon detecting that the charging voltage is equal to the charging cut-off voltage, wherein the charging cut-off voltage equals to N times a $K^{th}$ preset cell voltage; and ending charging of the battery upon detecting that a charging current applied to the battery is smaller than a charging cut-off current.

10. The method of claim 5, in response to the plurality of cells being coupled in parallel, the method further comprising:

in the $K^{th}$ stage, ending charging of the battery upon detecting that the charging voltage is equal to the charging cut-off voltage, wherein the charging cut-off voltage equals to a $K^{th}$ preset cell voltage.

11. The method of claim 5, in response to the plurality of cells being coupled in parallel, the method further comprising:

in the $K^{th}$ stage:

applying the charging cut-off voltage to the battery for constant-voltage charging upon detecting that the charging voltage is equal to the charging cut-off voltage, wherein the charging cut-off voltage equals to a $K^{th}$ preset cell voltage; and ending charging of the battery upon detecting that a charging current applied to the battery is smaller than a charging cut-off current.

12. An apparatus of charging control for a device to-be-charged, the device to-be-charged comprising a battery which comprises a plurality of cells, and the apparatus comprising:
a charging unit configured to:
apply K stages of constant-current charging to the battery in charging of the device to-be-charged, wherein K is a positive integer greater than one; and
in each of the K stages, apply a preset current corresponding to the stage to the battery for constant-current charging until a voltage of the battery reaches a preset voltage corresponding to the stage, wherein a preset voltage corresponding to a $K^{th}$ stage is a charging cut-off voltage, and the charging cut-off voltage is higher than a rated voltage of the battery;
a detecting unit configured to, in each of the K stages, detect a charging voltage applied to the battery and a voltage across each of the plurality of cells; and
a control unit configured to control the charging to proceed to a next constant-current charging stage in response to at least one of the charging voltage and a voltage across any of the plurality of cells being higher than the preset voltage corresponding to the stage;
wherein the charging unit is further configured to:
in an $i^{th}$ stage of first K−1 stages, apply an $i^{th}$ preset current to the battery for constant-current charging until the voltage of the battery reaches an $i^{th}$ preset voltage, wherein i is a positive integer which is greater than or equal to one and less than or equal to K−1, and an $(i+1)^{th}$ preset current is smaller than the $i^{th}$ preset current; and
in the $K^{th}$ stage, apply a $K^{th}$ preset current to the battery for constant-current charging until the voltage of the battery reaches the charging cut-off voltage, wherein the $K^{th}$ preset current is smaller than a $(K−1)^{th}$ preset current.

13. The apparatus of claim 12, wherein the control unit is configured to:
in the $i^{th}$ stage:
determine, based on the charging voltage detected, whether the charging voltage is higher than the $i^{th}$ preset voltage, wherein the $i^{th}$ preset voltage represents a preset threshold voltage of the battery in the $i^{th}$ stage;
for each of the plurality of cells, determine, based on the voltage across the cell detected, whether the voltage across the cell is higher than an $i^{th}$ preset cell voltage, wherein the $i^{th}$ preset cell voltage represents a preset threshold voltage of a single cell in the $i^{th}$ stage, and the $i^{th}$ preset cell voltage is higher than a rated voltage of the single cell; and
control the charging to proceed to an $(i+1)^{th}$ stage in such a manner that the voltage across each of the plurality of cells detected in the $i^{th}$ stage is not higher than the $i^{th}$ preset cell voltage, in response to at least one of the following conditions being satisfied:
the charging voltage is higher than the $i^{th}$ preset voltage; or
the voltage across any of the plurality of cells is higher than the $i^{th}$ preset cell voltage.

14. The apparatus of claim 12, wherein the control unit is further configured to:
in the $K^{th}$ stage, end charging of the battery or apply the charging cut-off voltage to the battery for constant-voltage charging, upon detecting, by the detecting unit, that at least one of the following conditions is satisfied:
the charging voltage is higher than the charging cut-off voltage; or
the voltage across any of the plurality of cells is higher than a $K^{th}$ preset cell voltage.

15. A device to-be-charged comprising:
a battery comprising a plurality of cells;
a processor; and
a memory configured to store computer programs operable with the processor to:
apply K stages of constant-current charging to the battery in charging of the device to-be-charged, wherein K is a positive integer greater than one;
in each of the K stages, apply a preset current corresponding to the stage to the battery for constant-current charging until a voltage of the battery reaches a preset voltage corresponding to the stage, wherein a preset voltage corresponding to a Kth stage is a charging cut-off voltage, and the charging cut-off voltage is higher than a rated voltage of the battery;
in each of the K stages:
detect a charging voltage applied to the battery and a voltage across each of the plurality of cells; and
control the charging to proceed to a next constant-current charging stage in response to at least one of the charging voltage and a voltage across any of the plurality of cells being higher than the preset voltage corresponding to the stage;
wherein in each of the K stages, the computer programs operable with the processor to apply the preset current corresponding to the stage to the battery for constant-current charging until the voltage of the battery reaches the preset voltage corresponding to the stage are further operable with the processor to:
in an $i^{th}$ stage of first K−1 stages:
apply an $i^{th}$ preset current to the battery for constant-current charging until the voltage of the battery reaches an $i^{th}$ preset voltage, wherein i is a positive integer which is greater than or equal to one and less than or equal to K−1, and an $(i+1)^{th}$ preset current is smaller than the $i^{th}$ preset current;
apply the $i^{th}$ preset voltage to the battery for constant-voltage charging; and
control the charging to proceed to an $(i+1)^{th}$ stage in which the $(i+1)^{th}$ preset current is applied to the battery for constant-current charging, upon detecting that at least one of the following conditions is satisfied:
a charging current applied to the battery is equal to the $(i+1)^{th}$ preset current; or
the voltage across any of the plurality of cells is higher than an $i^{th}$ preset cell voltage; and
in the $K^{th}$ stage, apply a $K^{th}$ preset current to the battery for constant-current charging until the voltage of the battery reaches the charging cut-off voltage, wherein the $K^{th}$ preset current is smaller than a $(K−1)^{th}$ preset current.

16. The device to-be-charged of claim 15, wherein when the plurality of cells are coupled in series, the $i^{th}$ preset voltage equals to N times the $i^{th}$ preset cell voltage, wherein N represents the number of cells in the plurality of cells, and N is a positive integer greater than one; and when the plurality of cells are coupled in parallel, the $i^{th}$ preset voltage equals to the $i^{th}$ preset cell voltage, wherein the $i^{th}$ preset cell voltage represents a preset threshold voltage of a single cell in the $i^{th}$ stage.

17. The device to-be-charged of claim 15, wherein
when the plurality of cells are coupled in series, in the $K^{th}$ stage, the computer programs are further operable with the processor to:
- end charging of the battery when the charging voltage is equal to the charging cut-off voltage, wherein the charging cut-off voltage equals to N times a $K^{th}$ preset cell voltage; or
- apply the charging cut-off voltage to the battery for constant-voltage charging when the charging voltage is equal to the charging cut-off voltage, wherein the charging cut-off voltage equals to N times a $K^{th}$ preset cell voltage, and end charging of the battery when a charging current applied to the battery is smaller than a charging cut-off current;

when the plurality of cells are coupled in parallel, in the $K^{th}$ stage, the computer programs are further operable with the processor to:
- end charging of the battery upon detecting that the charging voltage is equal to the charging cut-off voltage, wherein the charging cut-off voltage equals to a $K^{th}$ preset cell voltage; or
- apply the charging cut-off voltage to the battery for constant-voltage charging when the charging voltage is equal to the charging cut-off voltage, wherein the charging cut-off voltage equals to a $K^{th}$ preset cell voltage; and
- end charging of the battery when a charging current applied to the battery is smaller than a charging cut-off current.

* * * * *